United States Patent [19]

Kidwell et al.

[11] Patent Number: 5,623,789

[45] Date of Patent: Apr. 29, 1997

[54] PITCH STABILIZING, POSITIONABLE EAVES-OVERHANG LIGHT SUPPORT ASSEMBLY

[76] Inventors: Steven A. Kidwell, 5941 Adkins Rd., Knoxville, Tenn. 37918; John N. Forrester, 508 High Point Orchard Rd., Kingston, Tenn. 37763

[21] Appl. No.: 304,685

[22] Filed: Sep. 12, 1994

[51] Int. Cl.[6] .................................................. E04F 19/00
[52] U.S. Cl. ............................ 52/28; 52/39; 52/741.1; 248/298.1; 248/343; 248/906; 362/147; 362/366
[58] Field of Search ............................ 52/28, 39, 713, 52/741.1; 248/906, 323, 343, 200.1, 298; 362/147, 148, 365, 368, 364, 366, 371

[56] References Cited

U.S. PATENT DOCUMENTS

| | | | |
|---|---|---|---|
| 1,782,791 | 11/1930 | Nielsen | 248/343 |
| 1,982,957 | 12/1934 | Knell | 248/906 X |
| 2,316,389 | 4/1943 | Atkinson | 248/906 X |
| 2,670,919 | 3/1954 | Esoldi | 52/28 X |
| 2,802,933 | 8/1957 | Broadwin | 362/364 X |
| 2,809,002 | 10/1957 | Rudolph | 248/906 X |
| 2,963,253 | 12/1960 | Maier et al. | 248/906 X |
| 3,609,338 | 9/1971 | Kripp | 362/366 |
| 4,050,603 | 9/1977 | Harris et al. | 248/906 X |
| 4,062,512 | 12/1977 | Arnold | 248/906 X |
| 4,313,154 | 1/1982 | Capostagno et al. | 362/365 |
| 4,336,575 | 6/1982 | Gilman | 362/147 |
| 4,471,416 | 9/1984 | Druffel | 362/145 X |
| 4,829,410 | 5/1989 | Patel | 362/365 X |
| 4,972,339 | 11/1990 | Gabrius | 362/365 X |
| 5,029,794 | 7/1991 | Wolfe | 248/343 |
| 5,044,582 | 9/1991 | Walters | 248/343 X |
| 5,068,772 | 11/1991 | Shapiro et al. | 362/365 |
| 5,074,515 | 12/1991 | Carter, Jr. | 248/906 X |
| 5,222,800 | 6/1993 | Chan et al. | 362/365 X |
| 5,303,894 | 4/1994 | Deschamps et al. | 248/343 |
| 5,440,471 | 8/1995 | Zadeh | 362/364 X |
| 5,452,193 | 9/1995 | Hinnefeld et al. | 362/148 X |

FOREIGN PATENT DOCUMENTS

| | | | |
|---|---|---|---|
| 687792 | 2/1953 | United Kingdom | 362/364 |

*Primary Examiner*—Carl D. Friedman
*Assistant Examiner*—Laura A. Saladino
*Attorney, Agent, or Firm*—M. Alex Brown, Patent Attorney

[57] ABSTRACT

A light support assembly for installation and use in a timber construction roof eaves overhang; of the type having a pair of adjoining roof rafters, a facia board, and a soffit board or plane for positioning a soffit board if desired or anticipated; is disclosed. The support assembly is provided with a coupling having a biased channel for firmly sliding and supporting at least two frame tracks for extension and retraction within the spacing provided within adjacently constructed roof rafters in a roof overhang area, and for attachment to each of the rafters. The coupling, then supported by the secured tracks, supports and has attached to it an electric box for receiving lighting or electric fixture or wiring in the roof area where the assembly is inherently designed to be installed. The assembly is installed in the environment of the roof eaves area by correlating from two to three generated positional planes from parts of the roof overhang, for secure installation and support of the electric box by the positioned and secured tracks, accordingly, in the overhang area, for supporting in desired position a lighting or flood light system to be installed in the eaves overhang area.

9 Claims, 8 Drawing Sheets

PITCH STABILIZING, POSITIONABLE EAVES-OVERHANG LIGHT SUPPORT ASSEMBLY

BACKGROUND OF THE INVENTION

1. Field of the Invention

This invention relates to an apparatus and method for providing a support system for mounting components of a flood light unit or system in a desired position within a roof or gable overhang area.

2. Background Information

The applicant is aware of U.S. Pat. Nos. 5,222,800; 5,074,515; 5,068,772; 4,972,339; 4,829,410; 4,471,416; 4,313,154; 4,050,603; 2,963,253 and 2,809,002; issued respectively to Chan et al., Carter, Shapiro et al., Gabrius, Patel, Druffel, Capostagno et al., Harris et al., Maier et al. and Rudolph; each found during a search. Rules 97 through 99 have been complied with in Applicants' enclosing copies of the above cited references with the original application in this case.

The Rudolph '002 reference discloses an adjustable bar hanger for installing electrical fixtures between a pair of non-pitched ceiling joists. It also discloses a pair of telescoped M-shaped bars having a clamping device comprising a saddle telescoping its support bars. The Rudolph reference, like the Maier reference are examples of similar types of inventions disclosing attempts to facilitate easier installation of electrical outlet boxes between wall studs or ceiling beams; and concerning themselves with mounting means where a supporting bar consisting of two slideable telescoped sections is adopted to extend between and be fastened to two adjacent wall studs or ceiling beams; and where means are provided at a suitable point on the bar for fitting into an opening in an outlet box to secure the box thereto.

The Carter '515 reference is an example of an invention together with other examples, including the Chan '800 and Druffel '416 references, where some capability is given to adjust the pitch or angle of a conventional junction box or light retaining frame or unit being utilized in a substantially flat ceiling area inside a building within its spaced joists in the ceiling. Carter discloses a hanger bar for ceiling fixtures of the pivotally connected variety, which can be adjusted to accomodate the bar to different horizontal joist spacings while disclosing the ability to secure the bar firmly in place between two ceiling joists when each of two sections of a bar are placed into linear alignment with one another.

None of the references specifically illustrate or teach the present invention. Nor is the present invention obvious in view of any of the known prior art references listed herein. In addition, all of the prior art heretofore known suffer from a number of disadvantages:

(a) The prior art references do not disclose an easily assembled device which is available and functions as a one unit assembly capable of easily resolving the placement and support problems of securing an electric lighting system or flood light unit to the corner or side eaves overhang areas created by roof rafters, positioning of soffit board and the facia board of a roof or gable area on upper portions of houses or buildings.

(b) The prior art inventions further provide no optimally cost/time effective means to place lighting units level with a soffit board installation, while easily within the same unit compensating for an existing pitch or angle in the roof and supporting rafters adjacent to a preselected eaves overhang area.

(c) The prior art devices further fail to provide an optimally effective means with the use of one easily preassembled unit to adjust the electric box being installed to house and support a lighting unit in an eaves overhang area for special or preselected placement of the light, or centering thereof, between unequally spaced or positioned rafters of a roof adjacent to an overhang area.

(d) Additionally, the prior art devices do not provide, without piecemeal assembly, the ability in one easily assembled and installed assembly, the ready capability of contemporaneously adjusting diagonal or rotational position, vertical and horizontal position, in installing a light support system so that the light may be installed substantially level with a soffit member in a roof or gable overhang; or otherwise level in a preselected position in any building eaves overhang area, whether under a pitched or flat section of a roof area.

In the past in a substantial number of construction jobs involving contracting for building many types of buildings and homes having pitched or flat roofed areas creating overhang areas where it was desired to have a light installed; it has often been the case where electric contractors have needed to leave electric wires exposed in the upper eaves or overhang areas for later piecemeal, inconsistent or unplanned or fabricated construction of a supporting means to somehow hold a light or flood light unit in a preselected position, such as the corner eaves overhang of a home. Therefore, it has almost always, or substantially often, been necessary for an additional worker or subcontractor to come out to a building site to fabricate whatever support pieces might work, or be randomly constructed, in an overhang area to support a light before installing a soffit board member or other covering for the area in and around the lighting fixture, to give the building or home eaves area a sightly or finished appearance. All of which has led to wasted time, energy and expense. The problem has also led to the construction at different eaves portions in a given building, commonly worked on by contracting construction personnel; of different, inconsistent, piecemeal eaves light supporting or securing structures.

Accordingly, it is the object of the present invention to provide a novel, cost and time effective, and consistently installable and useable, light support, preassembled assembly of reasonably simple construction for use in an eaves overhang area of a home or building having roof rafters and a facia board in such an area; for expedited, simple and quick installation in such an eaves space.

It is an additional object of the present invention to provide a ready-made, easily-preassembled light support assembly which inables a worker to have a consistent method of installing the assembly on rafters in a roof overhang area, supporting a pitched or flat roof in such an area, where this pitch (angle) or flatness can be easily compensated for, installing the assembly so that it mounts flush or seated to the level or anticapated level of a soffit board or other covering in an eaves area to permit a more easily obtained finished appearance while supporting a light fixture.

Yet a further object of the present invention is to provide a pitch stabilizing, positionable eaves-overhang light or flood light support system which by its inherent nature provides an improved, novel method of installing a light support assembly in a roof or gable eave or overhang area of a roof which easily compensates for the pitch or angle (or other position such as flat) of a roof-supporting rafter, any different or unequal spacing between such roof or support rafters and any related positioning of a facia board, soffit board, or related construction in and a part of an overhang area.

SUMMARY OF THE INVENTION

The foregoing and other objects can be achieved with the present invention which is a light support assembly for use in a timber construction roof eaves overhang substructure of the type having a substantially vertical facia board, generally at least a pair of rafters for adjacently supporting a roof in a home or building inclined at an angle relative to the horizontal; including support means coupled to the rafters for supporting a soffit board in a substantially horizontal position, forming a substantially right angle intersection with the facia board; where the soffit board is placed in location for final finished construction at a latter time in the assembly of the overhang substructure and can be assembled independently of the facia board.

The light support assembly of the present invention includes a tensioned coupling element constructed from resilient, flexable material which has outer and inner surfaces and which contains an integrally biased channel within the coupling element which places pressure inwardly while allowing movement of members inserted in this channel. The coupling element has an electric box receiving means attached to its outer surface, for positioning with the coupling element relative to the rafters, facia board and anticipated position and level of the soffit board in the roof eaves overhang area.

The light support assembly is also provided with at least a pair of frame track elements, each having a plurality of position holes. One end of each track element is slideably inserted into the biased channel of the coupling element where each track can slideably move while being retained in the coupling element, for engaging at another end of each track element, each of the adjoining roof rafters so that the entire assembly can be supported for the installation of a lighting fixture in a preselected eaves-overhang, roof area.

DETAILED DESCRIPTION OF THE PREFERRED EMBODIMENTS OF THE INVENTION

The following description of the preferred embodiments of the concepts of this present invention is made in reference to the accompanying figures. Where an individual structural element is depicted in more than one figure, it is assigned a common reference numeral, numeral and prime mark or numeral and small case letter, for simplification of identification and understanding Referring now to the drawings, and more particularly to FIGS. 1 through 4, thereof, there is illustrated a pitch stabilizing, positionable eaves overhang light support assembly at 10. The light support assembly 10 is for use in a timber construction (contructed) roof eave overhang substructure 20, illustrated generally in FIGS. 8 through 14. It will be understood that such an overhang substructure is generally provided with at least a pair of adjacent supporting roof rafters 22, usually inclined at some angle or pitch relative to the horizontal, a facia board 24; and support means adjacent or coupled to the rafters 22 for supporting a soffit board 26 in a substantially horizontal position, to form a substantially perpendicular or right angle intersection with the facia board 24. In constructing such overhang 20 areas it is generally understood and most often the case that soffit board 26 is placed in final constructed, finished location or position, later in the process of constructing the overhang 20 and is generally, though perhaps not always, assembled independently of the facia board 24 and rafters 22. In so doing, the construction of other needed structures in the overhang area, such as lighting or flood light fixtures, or other home items generally located in that area, is facilitated in due course or turn during construction and finishing of a building. It will be understood that flood lighting fixtures and such are almost always constructed prior to adding the soffit board 26 covering, and usually involve time-consuming or costly piecemeal construction of a supporting fabrication which will somehow support, by random, a light fixture adjacent to available free-hanging electric wiring made available by a contractor or worker under an overhang 20 area.

The present invention and assembly 10 is, therefore, installed in and inherently connected to the environment described herein as generally constituting an overhang substructure 20. This overhang 20 area is generally provided with pitched or angled rafters 22, relative to the horizontal. It will, however, also be understood that such overhang 20 areas may also include substantially flat or completely flat supporting rafters 22 relative to the horizontal adjacent to the general space defined by an overhang 20. The present assembly 10 is especially designed to be installed to positionally compensate for pitched, spaced rafters 22; and the assembly can also be adequately installed in such flat rafters as well between spaced areas between such rafters 22.

The present novel assembly 10 is provided with a tensioned or integrally biased coupling element 30, usually constructed in accordance with the present invention from flexible, resilient material such as from various laminates, plastics, metals, rubber, woods, other polymers or combinations thereof; so that when the material utilized is properly molded to concepts and standards of the present invention, the material retains a constant, resilient, consistent biasing force where it is intended to do so as explained further herein.

Figure 4:
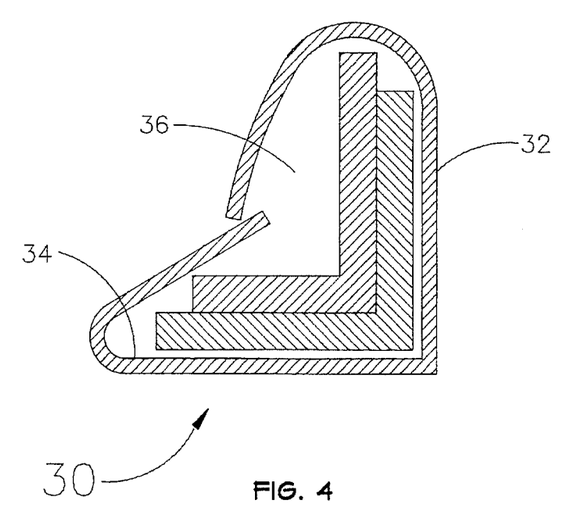
FIG. 4 is a right side view cross-section of one embodiment of the coupling element and inserted frame tracks of the present invention.

As a part of the basic concept of the assembly 10, the coupling 30 material is provided with an outer surface 32 and an inner surface 34, as illustrated in FIG. 4.

The inner surface 34 of the coupling 30 is constructed to enclose and define an integrally biased channel 36 in the coupling. The channel 36 is conceptualized and designed to be molded so that the pressure or biasing force is substantially directed downward or toward inner portions of the coupling and channel 36. In so doing, members inserted into the channel to be later described herein, can have inward pressure exerted upon them while still permitting such members to move or slide against each other. Additionally, the coupling 30 is provided with an electric box receiving means 38. The electric box 38 is generally of traditional, conventional, cylinder-like, or other, construction, used in the art for receiving wiring and a connected lighting fixture such as a flood light fixture 40; as illustrated in FIGS. 1–3 and 6–12. The electric box 38 is attached to the outside surface 32 of the coupling 30, as illustrated in the referenced drawings.

Figure 1:
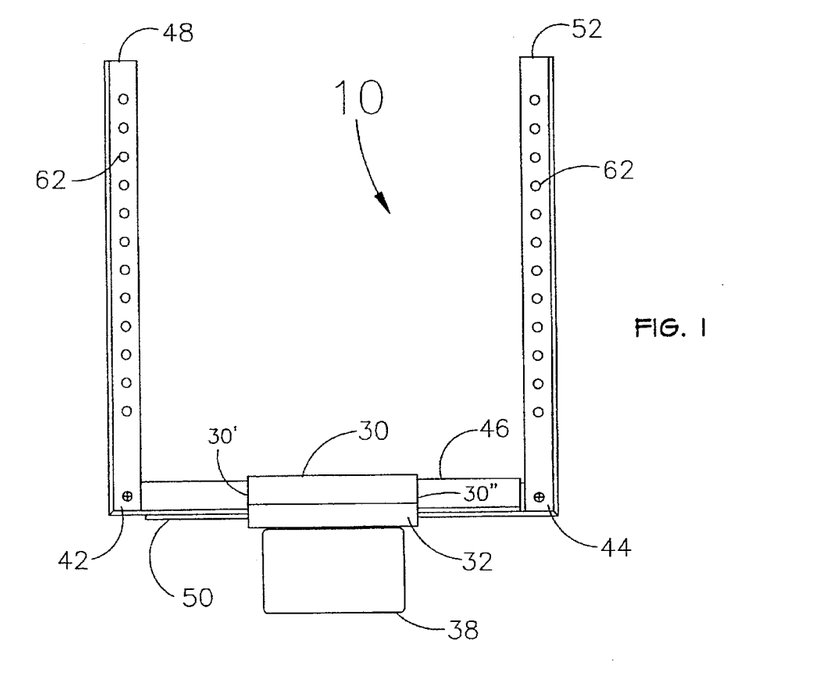
FIG. 1 is a front view of a first embodiment of a pitch stabilizing, positionable eaves-overhang light support assembly constructed in accordance with the present invention.
Figure 2:
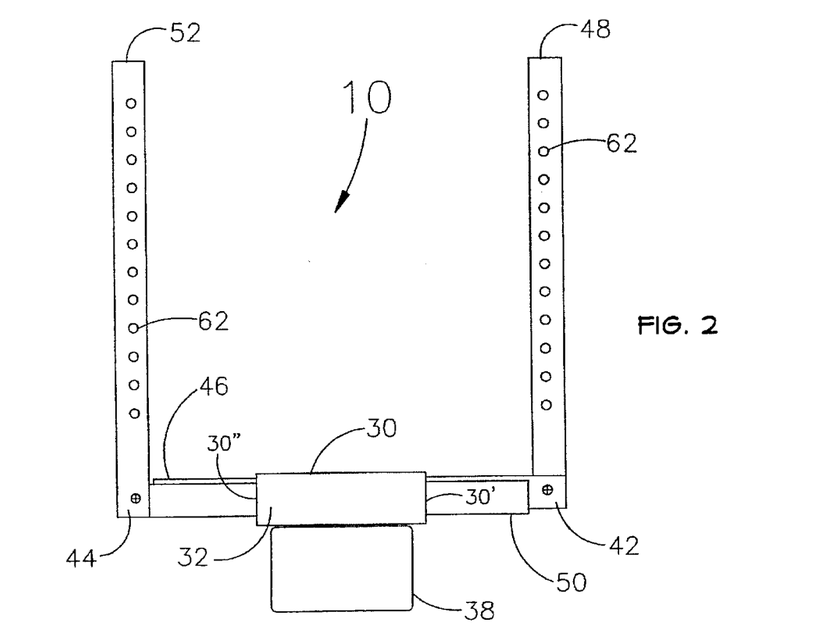
FIG. 2 is a rear view of the eaves-overhang light support assembly illustrated in FIG. 1.
Figure 3:
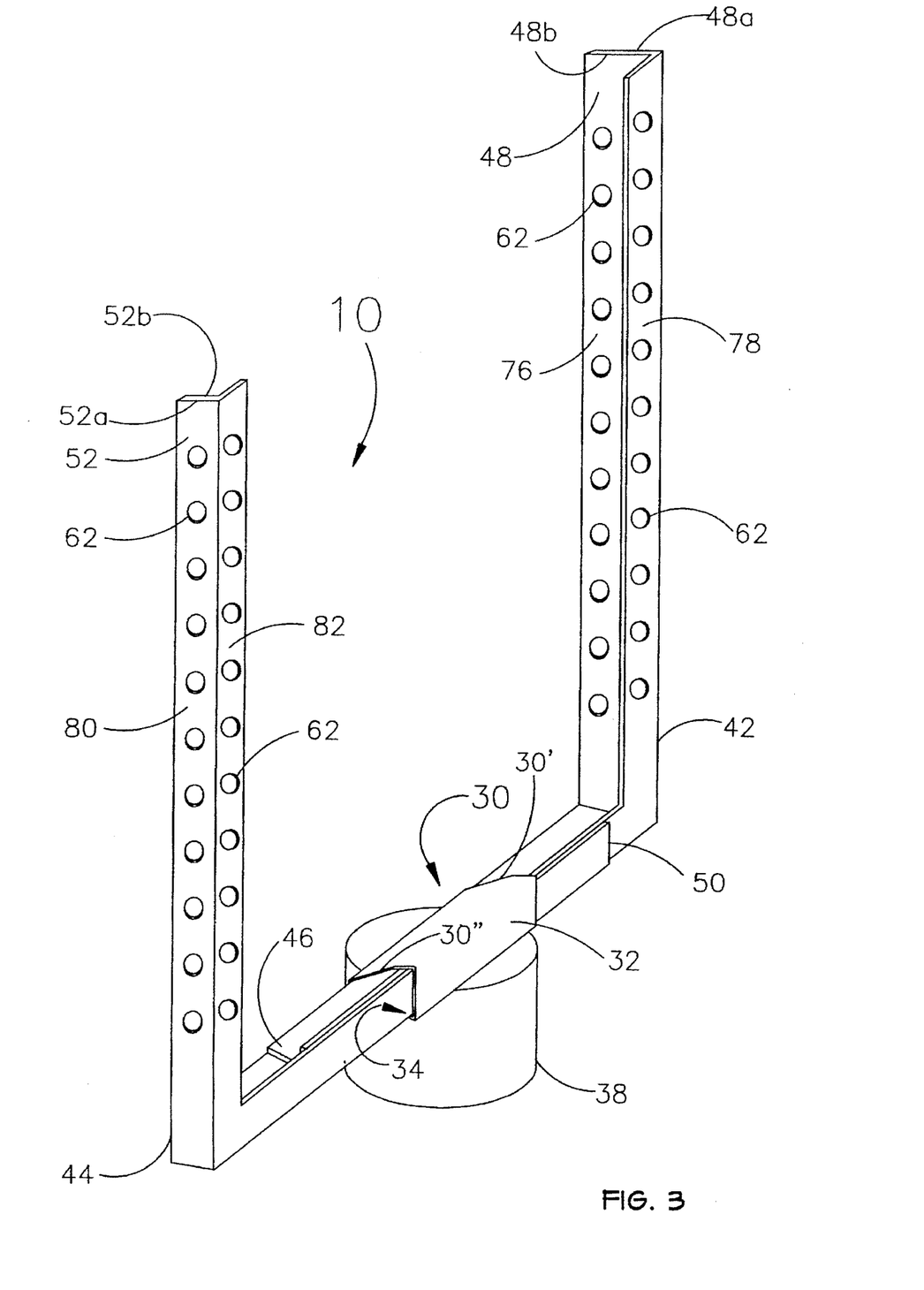
FIG. 3 in an enlarged side rear perspective of the embodiment of FIG. 1.

The assembly 10 is further provided with two frame track elements, a first frame track 42 and a second frame track 44, as illustrated in FIGS. 1 through 7. Further frame track elements could be employed within the scope of the invention. Each frame track element presently described and illustrated is provided, at least, with first and second ends: the first frame track 42 has a first end 46 and a second end 48; and the second frame track 44 has a first end 50 and a second end 52. Additionally, the second end 48 of the first frame track 42 has, at least, one outer surface 48a and one inner surface 48b; the second frame track's 44's second end thereof 52 has an outer surface 52a and an inner surface 52b; as illustrated in FIG. 3.

The outer and inner surfaces 48a and 48b, respectively, of the second end 48 of the first frame track 42; and the outer and inner surfaces 52a and 52b of the second end 52 of the second frame track 44; have and define between each respective pair of surfaces at least two position holes or grooves 62 on each frame track second end 48 and 52; as illustrated in FIGS. 1, 2, 3 and 7.

The first ends 46 and 50 of the frame tracks 42 and 44, respectively, are slidably registered and inserted into the first and second ends 30' and 30" of the coupling element 30; thereby, being held in firm but slideable relation to one another within the channel 36 of the coupling 30.

Each of the frame tracks 42 and 44 can then be slideably adjusted relative to the coupling 30 and electric box 38, attached to the coupling 30, so that the second ends 48 and 52 of the tracks 42 and 44, respectively, can engage each of at least a pair of adjacent rafters 22; and the coupling 30 and box 38, together, can be positioned horizontally, vertically, diagonally or rotationally relative to the overhang substructure 20 components including the rafters 22, the facia board 24 and the anticipated level or placement axis of the soffit board 26 in the roof eaves overhang 20; and attached to and supported by the rafters in a preselected position relative to the parts within the overhang 20.

In a preferred embodiment of the present invention the support assembly 10 is, then, therefore, installed within the overhang 20 by positioning the electric box 38, attached as indicated to the coupling 30, so that movement of one moves the other. In this manner the opening 38' of the box 38 is flush or closely adjacent, or close to, the horizontal plane or axis 26' generated by the anticipated (or measured for placement) position or actual placement, of the soffit board 26 in the overhang 20 area; as illustrated in FIGS. 8, 9, 10 and 12. The electric box 38 is then positioned along the horizontal plane 26' to a preselected position chosen by the worker installing the assembly 10, relative to, or between, an adjacent pair of rafters 22 in the overhang 20. In most cases, though not always, the adjacent pair of rafters 22 will be immediately adjacent and next to one another, and substantially parallel in pitch and placement to one another. However, it will be appreciated by those skilled in the art that the present assembly can be installed, leveled and positioned in an ornamentally pleasing relation to the other components of the overhang 20 even when adjacent rafters 22 are not parallel or other characteristics of the overhang 20 do not allow for completely horizontal positioning of a soffit board 26 or substantial vertical relative positioning of a facia board 24.

In installing the assembly 10 within its related overhang 20, the frametrack elements 42 and 44 are each slideably extended so that the second ends 48 and 52 of each is seated flush to each respectively of the adjacent rafters 22, while allowing the coupling 30 and electric box 38 to be evenly supported in the preselected position already obtained along the horizontal plane 26' relative to the rafters 22. The second end, each, 48 and 52, of each track 42 and 44, respectively, is then cut and severed so that the remaining part of each second end 48 and 52, each extends a preselected length relative to a top side portion 22' of each adjacent rafter 22, close or adjacent to the position of a roof 74 attached to the rafters 22. The respective second ends 48 and 52 of the frame tracks 42 and 44 are then fixed and secured to each respective adjacent rafter 22, for final support in the selected position.

In a preferred embodiment, the assembly 10 is utilized in an overhang 20 in positioning the electric box 38 so that it is substantially between or equidistant from two adjoining rafters 22, while still being positioned along the horizontal plane 26' of the soffit board 26.

In a preferred embodiment, the assembly 10 is provided with first and second frame track elements 42 and 44, each having a cross-section which has a substantially L-shaped configuration, as illustrated in FIGS. 3, 4, 7, 8 and 9. In this embodiment, the first track 42 has a first rail subelement 76 and a second rail subelement 78; and the second track 44 has a first rail subelement 80 and a second rail subelement 82. The first end 46 and the second end 48 of the first track 42 are substantially perpendicular to or at right angles with each other; and the first end 50 and the second end 52 of the second track 44 are also at right angles with each other. Additionally, the first and second rail subelements 76, 78 and 80, 82, respectively, of each respective track 42 and 44, each are provided with at least two position holes or grooves 62, and preferably a plurality of such holes 62, of 2 (two) to 12 (twelve) provided on each rail, as illustrated in FIGS. 1 through 3 and FIG. 7. More than 12 position holes can be provided, depending on the length and available space of the second ends 48 and 52 of each track 42 and 44. Although the preferred length or height would be about 10.5 to about 11.0 inches, or about 26.4 to about 27.6 centimeters, each respective second end (48, 52) can be longer (higher) or shorter (lower), in dealing with contact or installation space available on the sides of rafters 22 in accordance with various utilized angle or pitch of adjacent roof rafters 22 in an overhang 20 area; a prime objective of the present invention being, as indicated, to compensate for such pitch in rafters 22 in securing the electric box 38 of the assembly 10 so that it is flush or adjacent to the horizontal plane 26' of the position or anticipated position of the soffit board 26. In most applications, however, the height indicated for each second end of each track (44, 48) will provide enough height; and, therefore, be well suited; to attach to rafters 22 with the greatest pitch or least pitch commonly used in homes and other buildings within a roof area, and will leave a length of each respective second end of each track available to cut off or sever, in most applications, in installing the assembly 10 when rafters have a very low pitch or are substantially flat.

Additionally, the length of respective first ends 46 and 50 of each track 42 and 44 is about 12 inches so that when each is inserted into the coupling 30 and extended in opposite directions the assembly 10 generates a range of length so that the respective second ends 48 and 52 can be brought to a flush, seated position against each respective adjoining or adjacent rafter 22 in an overhang 20 employing reasonably conventional spacing between these types of raters; and even in many who do not employ conventional spacings. It will be understood that dimensions of each of the components of the assembly 10 and the overhang substructure 20 can vary while remaining consistent with the concept of the present invention as set forth herein.

Figure 5:
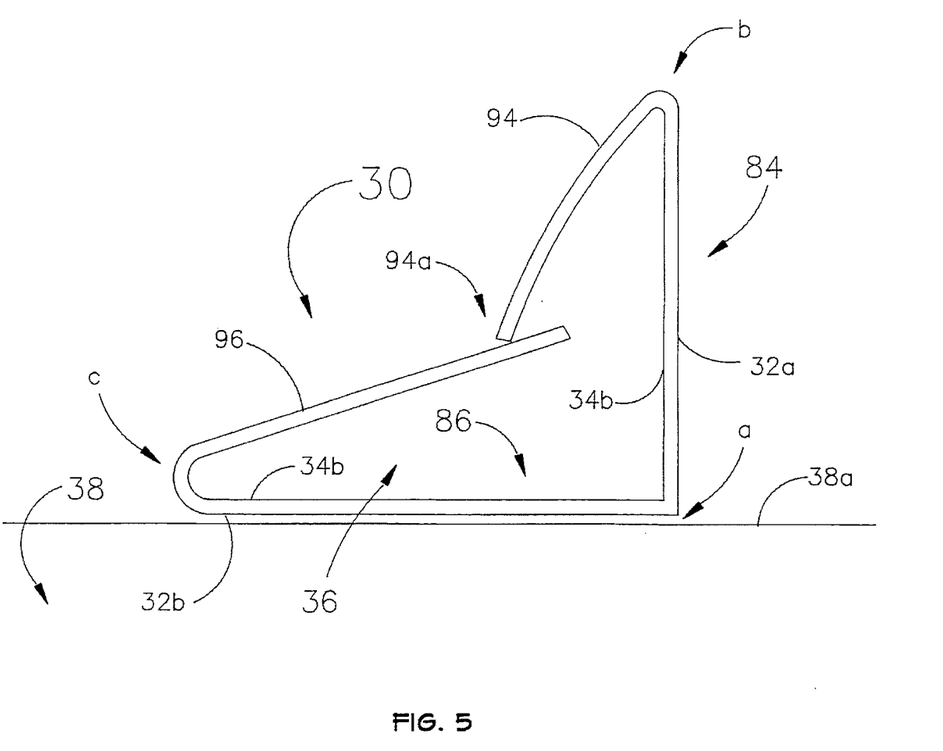
FIG. 5 is another embodiment of the coupling element viewed from the right side on the surface of the electric box, of the present invention.
Figure 6:
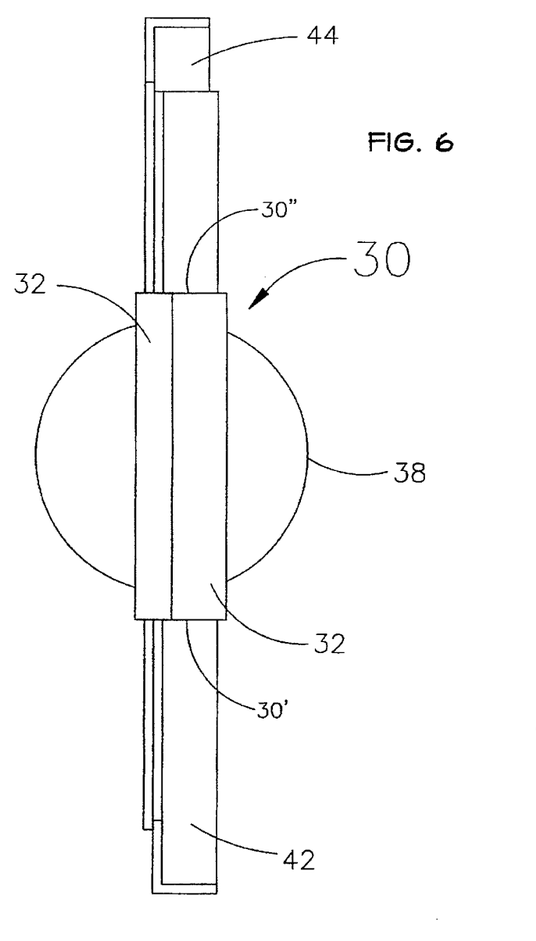
FIG. 6 is an enlarged top front view of the embodiment of FIG. 1.
Figure 7:
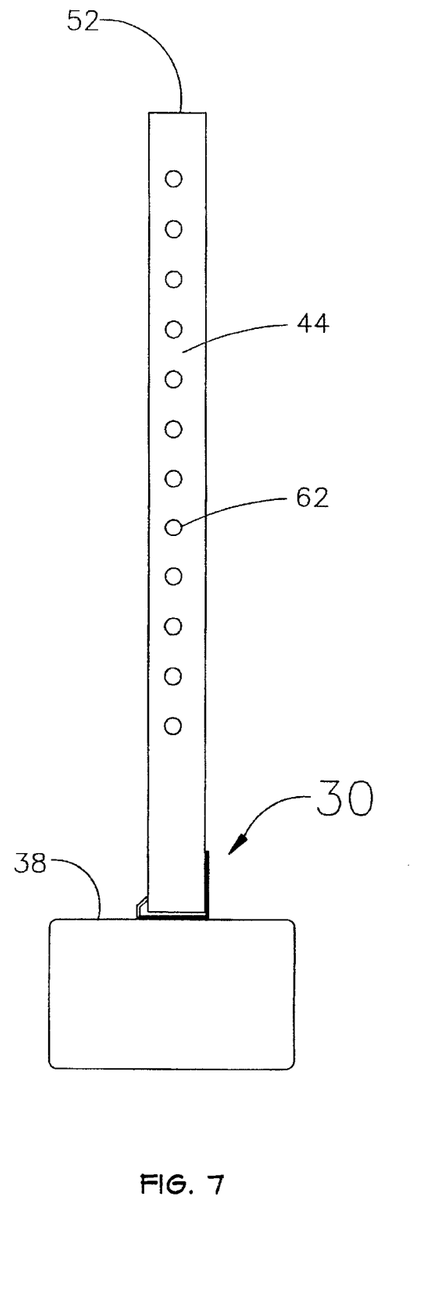
FIG. 7 is an enlarged right side view of the embodiment of FIG. 1.

In a preferred embodiment of the present invention, the coupling element 30 (also referenced as a coupling or clip member) is partially to substantially, or generally, provided in an L-shaped configuration, or visual shape; and provided with a first side 84 and a second side 86, fixedly (securely fixed), integrally or otherwise attached to each other at point a, as illustrated in FIG. 5. The first side 84 is provided with outside surface 32a and inside surface 34a; and the second side 86 is provided with outside surface 32b and inside surface 34b.

A first flap member 94 is fixedly, integrally, or otherwise attached to the first side 84 at point b, comprising the union with the free end of the first side 84 opposite the end attached at point a. The first flap 94 extends down towards the second side 86 and by its construction and shape exerts a biasing force generally downward towards this side 86.

The second flap member 96 is fixedly, integrally, or otherwise attached to the second side 86 at point c, comprising the union with the free end of the second side 86 opposite the end attached at point a. The second flap 96 extends upward, towards the first flap 94, extending just underneath the free end 94a of the first flap 94, and, extending upward, a short to medium distance beyond its intersection with the plane or arc generated by the free end 94a. In this position, illustrated by example in FIGS. 4 and 5, the second flap 96 exerts an upward biasing force toward the free end 94a of the first flap 94.

The coupling element 30 is securely attached to the roof 38a of the electric box 38 at the outside surface 32b of the second side 86 of the coupling 30.

The first frame track 42 and the second frame track 44 can be inserted and slided into the channel 36 of the coupling element 30. In this preferred embodiment, each of the tracks 42 and 44 is also generally "L-shaped", or in the configuration of an "L"; and upon insertion into the channel 36 of the coupling 30, each track will slide and move in relation to the other in a generally telescoped manner once inserted into the channel 36 so that each track 42 and 44 can extend away from and retract toward the coupling element 30.

The present assembly 10 is therefore inherently structured, designed for, and utilizable and installable, within the described connected inherent environment and installation area which has been described herein as an overhang substructure 20 including: roof rafters 22, facia board 24 and soffit board 26. The overhang 20 will also characteristically relate to or include a roof area 102 adjacent to the top side portion 22' of the rafter 22; and a wall area 104 at right angles with the soffit board 26 installation area and approximately parallel to the facia board 24; as illustrated generally by example in FIGS. 13 and 14.

In a preferred embodiment of the invention, the assembly 10 is installed on and between a pair of adjacent roof rafters 22 within the roof eaves, overhang substructure 20 by the process of: (1) positioning the assembly 10 so that the opening of the electric box 38 is substantially level with a horizontal plane 26' generated by the anticipated position of the soffit board 26, and perpendicular to the facia board 24 and the side of the building 104, in, or adjacent to, the overhang substructure 20; (2) centering the electric box 38 so that the box is placed in a position centered in the middle portion of the overhang 20 between an adjacent pair of roof rafters 22, with this centered position generating a vertical plane 22" which is perpendicular to the horizontal plane 26' and intersects with this plane, as shown generally by example in FIG. 8; (3) in the centered position of step (2), sliding and extending each track 42 and 44, each then inserted into the coupling 30, until each of the tracks comes to rest substantially seated and flush against a respective adjacent roof rafter 22 in the overhang 20; (4) cutting each track, 42 and 44, so that a plurality of the position grooves 62 on each respective track extends over the lateral side face area 22a, illustrated in FIGS. 10, 11 and 14; and (5) securely fixing and attaching each track, 42 and 44, to each respective side face 22a of each respective rafter 22, utilizing the available position grooves 62 to do this. In this manner, the electric box 38 is retained and supported, positioned and centered, at the intersection, or substantially at this point as so desired by the installer, of the horizontal plane 26' and the vertical plane 22" in the overhang 20.

In accordance with special considerations or preferences of the installer, or special spacing needs or requirements regarding the rafters 22 or other conditions or parts of the overhang 20; the process of installing the assembly 10 can, within the concept of the invention, include the additional step of further slideably adjusting the electric box 38 and track members 42 and 44, each of which can move in relation to the other, to a preselected position in accordance as indicated with special needs and conditions in the roof overhang 20.

The fixing and attaching step (5) described just above can include placing attachment means such as nails, screws, revets, axial clamps or any number of other securing members or means through at least one position hole 62 of each of the tracks 42 and 44, respectively, to safely secure each of the tracks to each respective adjoining roof rafter 22.

The horizontal plane 26' established by the position or anticipated position of the soffit 26 is also referenced herein as a first position plane. The vertical plane 22" established or generated by positioning generally between the roof rafters 22 is also referred to herein as a second position plane, and intersects with the first position plane (26'—described above) in the overhang 20. Additionally, the top side portion 22' of each adjacent roof rafter 22 generates a third plane 23', from which, in a preferred embodiment, the intersection of the first plane (26') and the second plane (22") is measured for the purpose in the present invention of cutting the portion of each track, 42 and 44, which would extend beyond this third plane 23' if placed or secured flush against the lateral side face area 22a of each rafter 22, if not cut as indicated. Therefore, in so doing, in this embodiment, the remaining portion of each track, 42 and 44, will be left to extend substantially to the third plane 23' of each rafter (42 and 44), for being secured in this position flush against each respective lateral side face 22a of each respective adjoining rafter 22, as illustrated generally in FIGS. 8, 9, 10 and 12.

Figure 8:
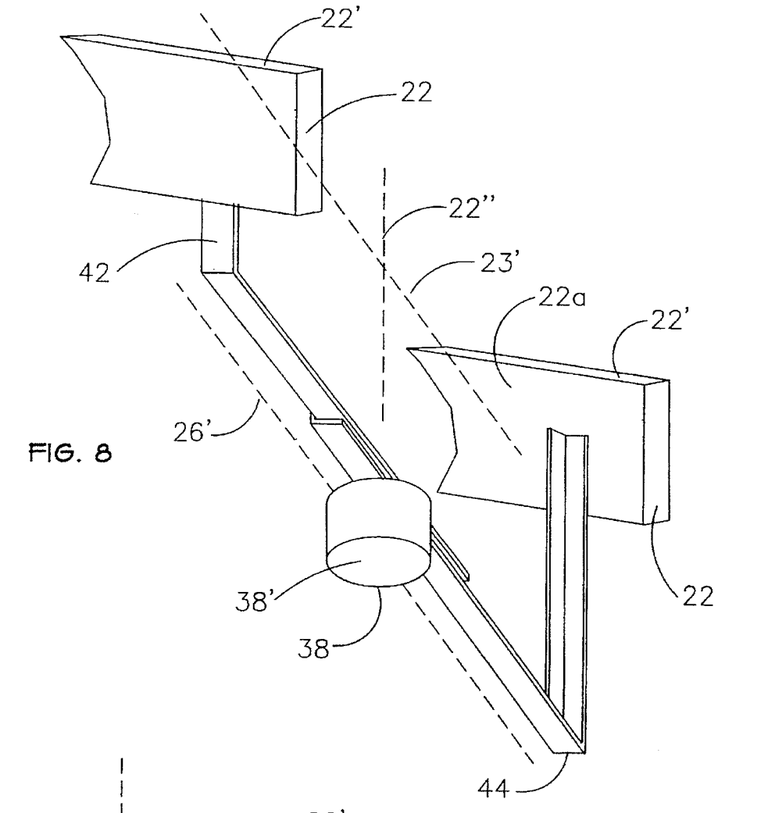
FIG. 8 is a bottom side perspective view of a second embodiment on the present invention, showing the light support assembly of the present invention in installed position on an adjoining pair of roof rafters in an overhang substructure with which the present invention is utilized.
Figure 9:
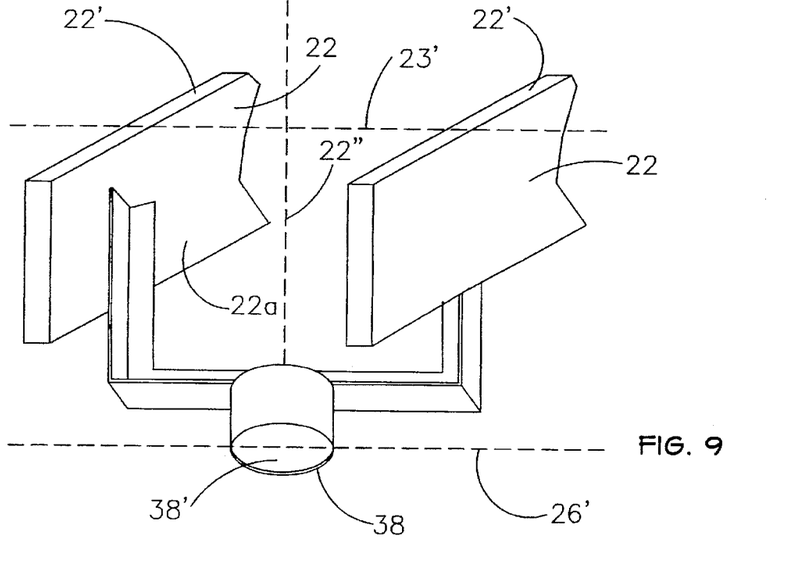
FIG. 9 is a bottom front perspective of a third embodiment of the invention, shown installed in a shorter spaced pair of adjoining roof rafters in the overhang substructure of the present invention.
Figure 10:
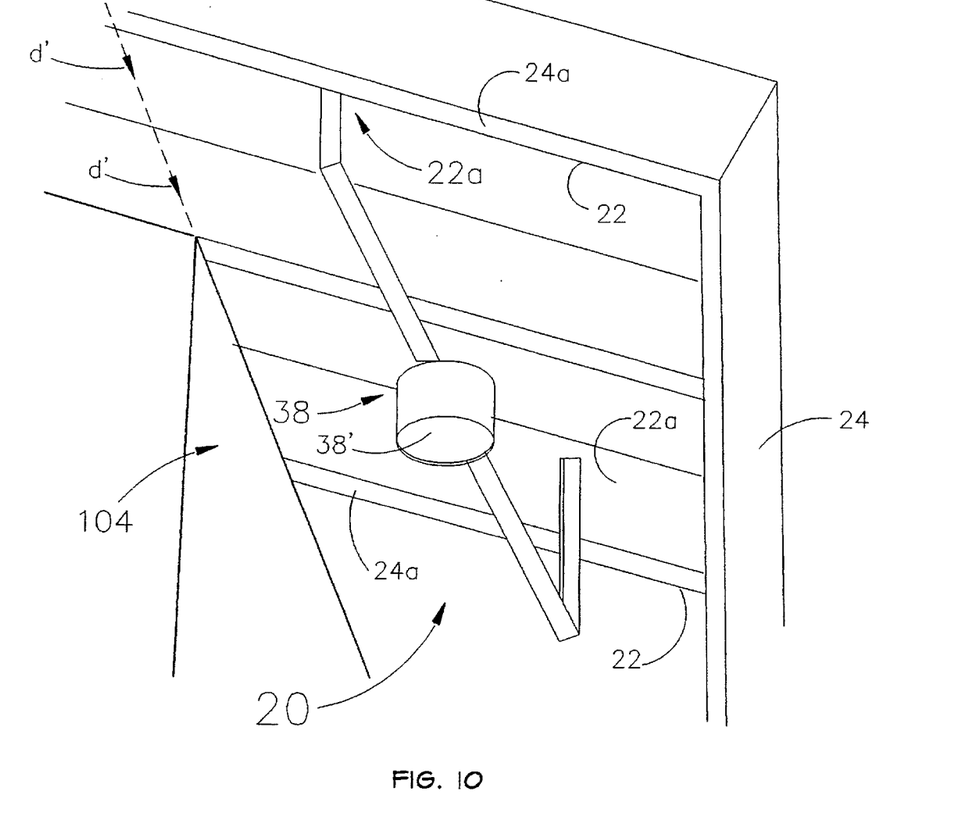
FIG. 10 is a bottom side perspective of an eaves-overhang corner portion of a building, showing the third embodiment of the present invention installed between an adjoining pair of roof rafters.
Figure 11:
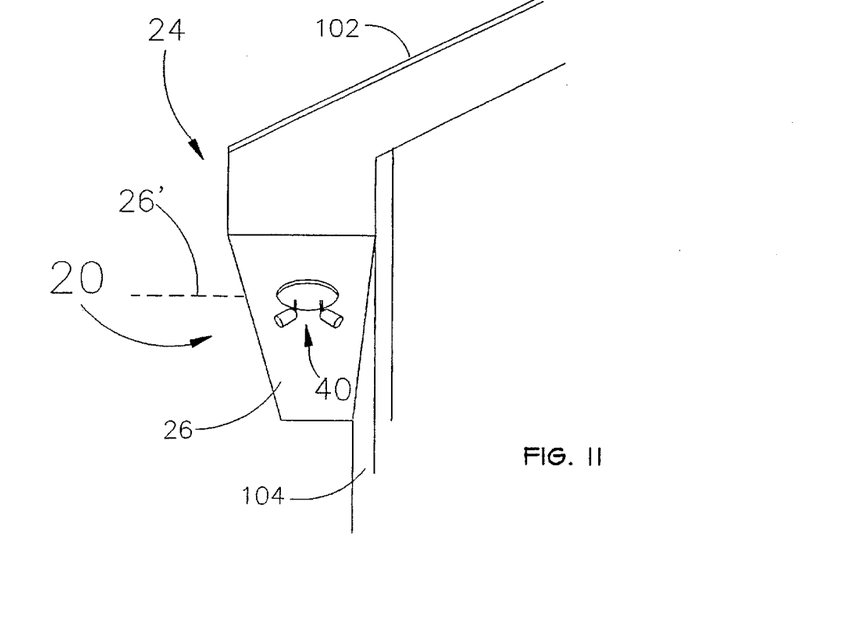
FIG. 11 is a perspective of a corner eaves-overhang portion, showing the finished installed flood light and soffit installed on and around the covered installation of the present invention.
Figure 12:
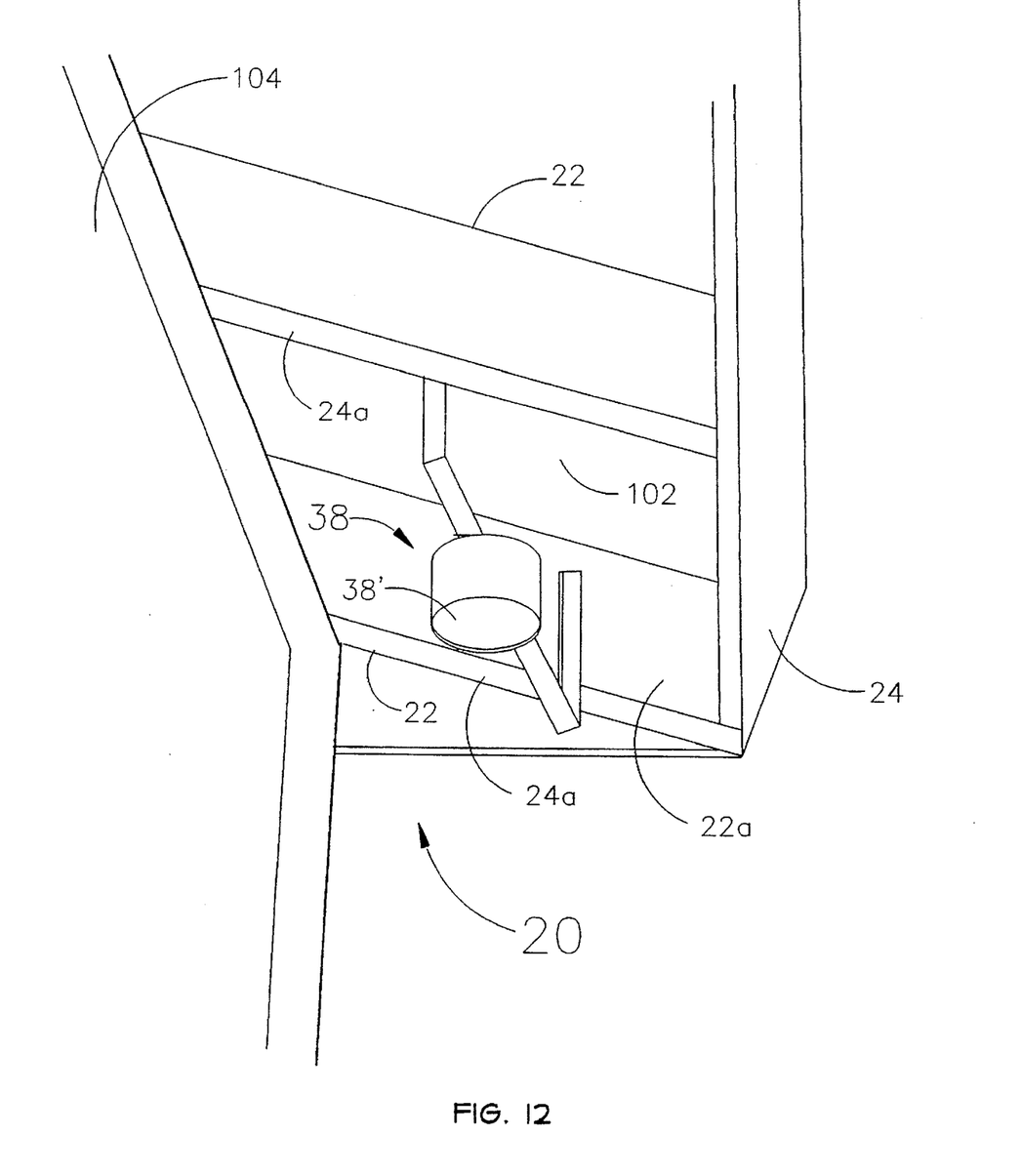
FIG. 12 is a perspective of a corner eaves-overhang corner portion with which the third embodiment of the invention is shown installed between shorter spaced adjoining rafters of the overhang portion.

The measuring and securing steps, in a preferred embodiment, can also be carried out so that each respective track (42 and 44) is secured against each respective adjoining lateral side face 22a, so that each extends approximately half way up the side face 22a for positioning and securement purposes, as illustrated by example in FIG. 8.

In securing the tracks 42 and 44 to the respective adjacent rafters 22, it is within the concept and scope of the invention for each respective track to be securely attached as an inlaid member, portion or component on or within a hollow portion or area of the rafter receiving the track, and securely fixed therein and thereon, or directly affixed to the flat lateral surface of a rafter 22; without specificaly, in part or in whole, utilizing the position holes 62 for attachment or connection purposes.

Within the concept of the present invention and scope thereof of the assembly 10, it will be understood that the assembly 10 can be installed between two adjoining, respective rafters 22 of a gable portion of a roof (area or arch/corner overhang area over a window—not specifically illustrated in the drawings); or on a flat edge portion of a roof where rafters (22) extend or are adjacent thereto.

It will be understood, as indicated and illustrated, that the channel 36 of the coupling 30 will generally be L-shaped in configuration to receive the tracks, 42 and 44; but that various other biasing shapes with the described structure and function can be employed within the concept of the invention.

Additionally, as a part of the concept within the invention of the position hole or groove 62, this hollow groove can be formed to be extended laterally away from each respective track to form a spike-like hollow securement means for self-attachment of the track (42 and 44) in a desired position on a respective, adjoining rafter 22, for initial positioning and securement; where, then nail or other securing/coupling device or means can be entered through the hollow spike groove of one or more position holes (62) on a respective track (42 and 44) for firmly and securely fixing or attaching the respective track to the respective rafter.

Figure 13:
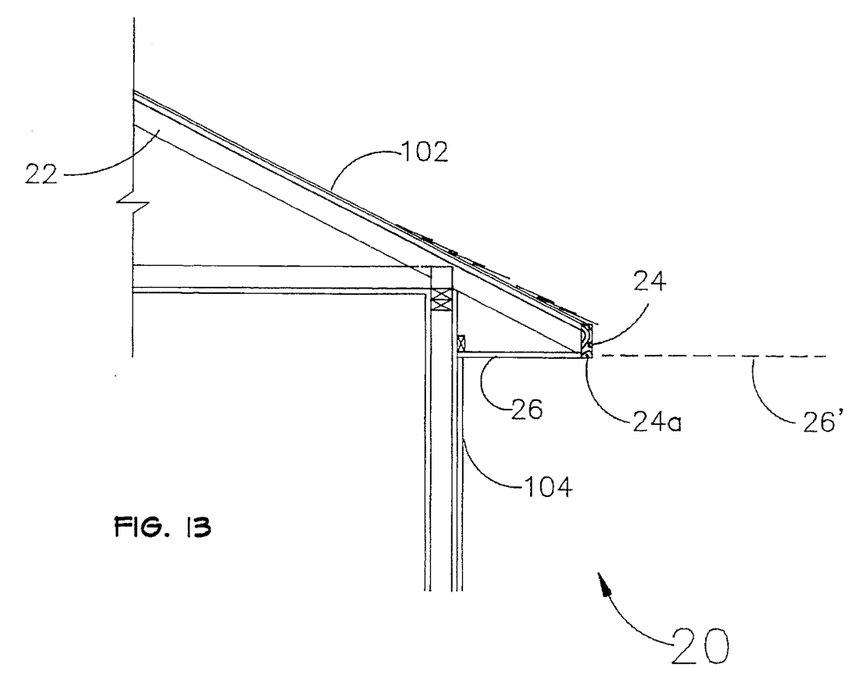
FIG. 13 is a cross-section view of one example of a conventional eaves-overhang substructure with which the present invention is utilized.
Figure 14:
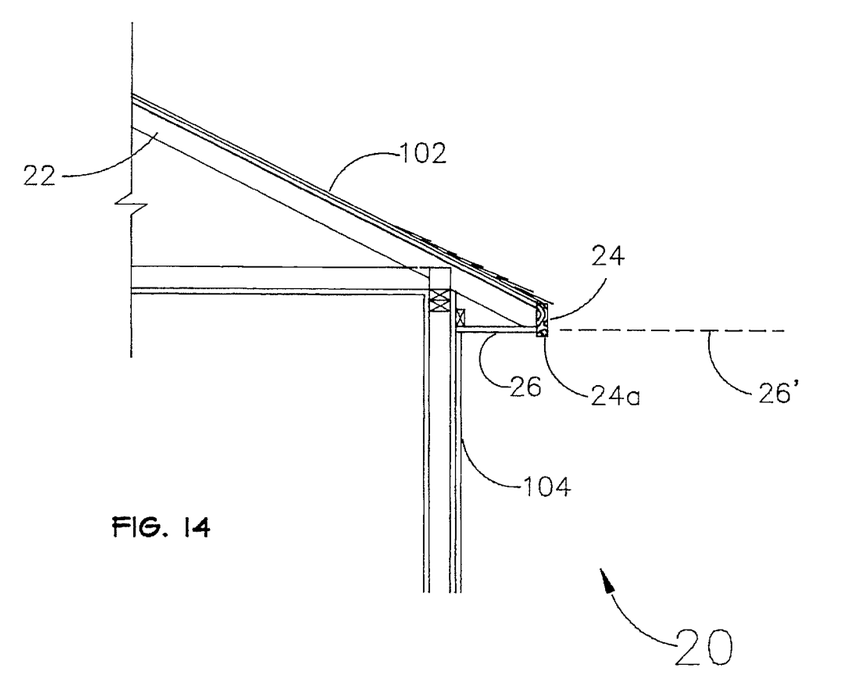
FIG. 14 is a cross-section view of another example of a conventional eaves-overhang substructure with which embodiments of the present invention are utilized.

It is also encompassed within the concepts of the present invention, that the assembly 10 can be hung, secured and supported on the position or portion of a roof constituting a perpendicular or opposite right or acute angle to the angle of the positioned rafters as heretofore illustrated and discussed. This possible positioning or plane is generally indicated as opposite plane d' in FIG. 12. In utilizing the assembly 10 in this positioning, the second rail subelement 78 of the first frame track 42 and the second rail subelement 80 of the second frame track 44 can be utilized to position and secure the assembly 10 along or facing toward the opposite plane d'. It will be noted that this plane d' is concurrent or parallel to the side wall 104, under the overhang 20, as one would look or view straight under the overhang 20—this view clearly being indicated in FIGS. 13 and 14, showing a cross-section of the overhang 20.

Conventionally, rafters are generally spaced from about 18 inches (45.72 cm.) to about 22 to 24 inches (about 55.88 cm. to about 60.96 cm). It will, however, be understood that other different spacing dimensions can be employed in constructing a roof area 102, and that the present assembly 10 will facilitate positioning and securement along many diverse types of rafter pitch, spacing and positioning within or opposite to various types of overhang 20 areas.

The present assembly 10 can also be utilized for securement and positioning along the plane generated by the bottom or ground most side 24a of the facia board 24, illustrated in FIGS. 10, 12, 13 and 14.

The assembly 10 can also be hung, installed, secured and/or positioned in an overhang area (20) where no soffit board is specifically utilized or anticipated, utilizing for positioning purposes the plane 26' (where a soffit 26 could have or would have been installed), or the plane or axis generated by the bottom most side 24a of the facia board 24. In these instances, and others, the horizontal plane 26' (or first position plane) described herein could be generated from the bottom most side 24a of the facia 24; as, in many instances in conventional building the soffit 26 is substantially in allignment with the plane or axis of the bottom side 24a, as illustrated generally in FIG. 13.

While the present invention has been described in connection with the particular embodiments and examples thereof, it will be understood that many changes and modifications of this assembly and inherent installation thereof may be made by those skilled in the art without departing from the true spirit, concepts and scope thereof. For example, as in part indicated before herein, other diversified types and kinds of materials and/or substances, etc., can be used to construct the coupling 30 and tracks 42 and 44, as well as the electric box 38; and a diverse choice and number of sizes, forms and shapes of configurations and forms can be utilized as to each of the parts and members of the assembly 10 described herein in practicing the present invention.

Accordingly, the appended claims are intended to cover all such changes and modifications as falling within the true spirit and scope of the present invention. The reader is requested to determine the scope of the invention by the appended claims and their legal equivalents, and not by the examples which have been given.

Having described my invention, I claim:

1. For use in a timber construction roof eaves overhang substructure having a substantially vertical facia board, at least a pair of rafters for adjacently supporting a roof, inclined at an angle relative to the horizontal, the rafters including support means adjacent to the rafters for supporting a soffit board in a substantially horizontal position, forming a substantially right angle intersection with the facia board, wherein the soffit board is placed in location at a latter time in assembly of the overhang substructure and can be assembled independently of the facia board, a light support assembly comprising:

a tensioned coupling element being constructed from resilient, flexible material having outer and inner surfaces and defining an integrally biased channel, placing pressure inwardly while allowing movement of members inserted therein, said coupling element having an electric box receiving means fixedly attached to its outer surface thereof for positioning with said coupling element relative to the rafters, facia board and anticipated position and level of the soffit board in a roof eaves overhang substructure; and at least first and second frame track elements, each having at least first and second portions, attached to each other substantially transversely, each of said portions thereby having a free end, each of the free ends of said first portions thereof being slideably inserted into said biased channel of said coupling element, for biased slideable movement in said channel and in relation to each other and for respectively engaging each of a pair of rafters at said second portion thereof;

the first and second portions of each of said track elements having a first rail subelement and a second rail subelement attached to one another at a substantially transverse angle such that the attached first and second subelements have a substantially L-shaped configuration when viewed from each of the respective free ends of the first portion and the second portion of each respective track element, each portion of each track element thereby having an L-shaped cross-section when viewed perpendicular to its longitudinal axis;

said first rail subelement and said second rail subelement of each of said second portions of each of said track elements, each, respectively, defining a plurality of position holes for securement of said assembly relative to rafters and a soffit board in a timber construction roof eaves overhang.

2. A method of installing, relative to an adjacent pair of sloped rafters and a soffit board in a roof overhang area, a light support assembly having an open-ended electric box means, a generally L-shaped, channeled coupling member attached to the electric box means and first and second L-shaped track members each having cross-sectionally, first and second transverse rail subelements and lengthwise, first and second ends transversely connected to one another, the first ends of each of said track members being slideably and biasably mounted within the channel of said coupling member, and the first and second transverse rail subelements of each of the respective second ends of each of said first and second track members defining channeled attachment holes; the method comprising:

positioning the electric box means and the coupling member so that the open end of the electric box means is substantially adjacent to a substantially horizontal plane generated by the anticipated position of the soffit board placement, and positioning the electric box means along the horizontal plane to a preselected position relative to each of the adjacent pair of rafters;

slideably extending the respective first ends of each of the respective first and second L-shaped track members such that each respective second end of the first and second L-shaped track members is seated substantially flush to each of the respective adjacent pair of rafters while allowing the channeled coupling member and the electric box means to be retained and supported along the horizontal plane in the preselected position relative to each of the adjacent pair of sloped rafters; and utilizing a preselected available length of each of the respective second ends of the track members to compensate perpendicularly from the horizontal plane for the slope of the rafters, and a preselected choice of the channeled attachment holes available on the transverse rail subelements of each respective second end of each of the respective track members, to secure each of the positioned track members within the roof overhang area securing the electric box means in the preselected position relative to each of the respective adjacent pair of sloped rafters.

3. The method of installing, relative to an adjacent pair of sloped rafters and a soffit board in a roof overhang area, a light support assembly of claim 2, wherein the process of installing the light support assembly comprises the additional step of further slideably adjusting the electric box means attached to the channeled coupling member and either of the track members to compensate for, and in accordance with, the spatial dimensions in the roof overhang area, to a further preselected position along the horizontal plane within the roof overhang area.

4. The method of installing, relative to an adjacent pair of sloped rafters and a soffit board in a roof overhang area, a light support assembly of claim 3, wherein said securing step comprises placing attachment means through at least one of the channeled attachment holes of each of the transverse rail subelements of each of the respective track members, and into each of the respective adjoining, adjacent pair of sloped rafters in the roof overhang area for attachment and securement thereto.

5. A pitch-stabilizing, positionable light support assembly, installable within a roof area for mounting a lighting fixture thereon such that it is substantially level with and centered in relation to the anticipated placement of a soffit member in an eaves overhang area defined by a roof, supporting roof rafters, connected facia board and an adjacent wall of a building, said support assembly comprising:

a first frame track member, having at least one outer surface face and one inner surface face;

a second frame track member, having at least one outer surface face and one inner surface face;

a generally L-shaped coupling member having first and second ends, said coupling member being constructed from resilient, flexible material having outer and inner faces and defining a biased channel between the first and second ends for resisted movement and positioning of each of said track members within said coupling member and in relation to one another;

each of said first and said second track members being itself L-shaped in configuration, and having first and second extended arm portions, said first arm portion of said first track member being slideably inserted into the channel at the first end of said coupling member, and said first arm portion of said second track member being slideably inserted into the channel at the second end of said coupling member; and electric box means having roof and bottom portions and defining an opening for receiving a lighting fixture, the roof of said means being attached fixedly to the outer face of said coupling member;

each of said track members defining a plurality of position grooves between the outer face and the inner face thereof, for placement, positioning and securing of the assembly to each of two substantially parallel, adjacent rafters within a roof area such that the electrical box means can be positioned and fixedly supported substantially flush with the anticipated position of a soffit member to be placed in a roof overhang area, and in such position, there, being available to receive and support a lighting fixture.

6. The light support assembly of claim 5, wherein:

said coupling member comprises:

a generally L-shaped member, having a first side and a second side fixedly attached to one another, each having inside and outside surface faces;

a first flap member fixedly attached to the free end of the first side, such that it extends towards and biases downward, toward the second side; and a second flap member fixedly attached to the free end of the second side, such that it extends towards and beyond the contact intersection of the first flap and biases upward thereto; and wherein:

said coupling member is fixedly attached to the roof of said electric box means at the outside surface face of the second side of said coupling member.

7. The light support assembly of claim 6, wherein:

the first side and the second side of said coupling member are integrally attached to one another;

the first flap member is integrally attached to the first side of the coupling member; and the second flap is integrally attached to the second side of the coupling member.

8. The light support system of claim 7, wherein:

each of said track members is slideably received in the channel within said coupling member such that each L-shaped track member is telescoped and moveably slideable upon each other for extension and retraction within said coupling.

9. In combination with a roof support unit of a building having at least two sloped and substantially parallel spaced apart roof rafters, and at least one transverse facia board member fixedly attached to one of the ends of each respective roof rafter and a soffit board positional space, defining an overhang space extending from the facia board to a side wall of the building;

a flood light support assembly having a first frame track member and a second frame track member, each having an L-shaped cross section a vertical extended portion for engagement with each of said roof rafters, a frame clip member defining an L-shaped channel for slideable register and movement of each of said L-shaped track members within said clip member and in relation to one another, an electric box means for supporting an electric lighting component, having roof and bottom portions and defining an opening for receiving a lighting component, said electric box means being fixedly attached to said clip member, the respective vertical extended portion of each of said track members defining a plurality of position holes therethrough for engagement and attachment of each of said track members respectively to each of said roof rafters.

* * * * *